June 17, 1930. R. E. TIDMARSH 1,764,478
NONGLARE SHIELD
Filed March 16, 1928
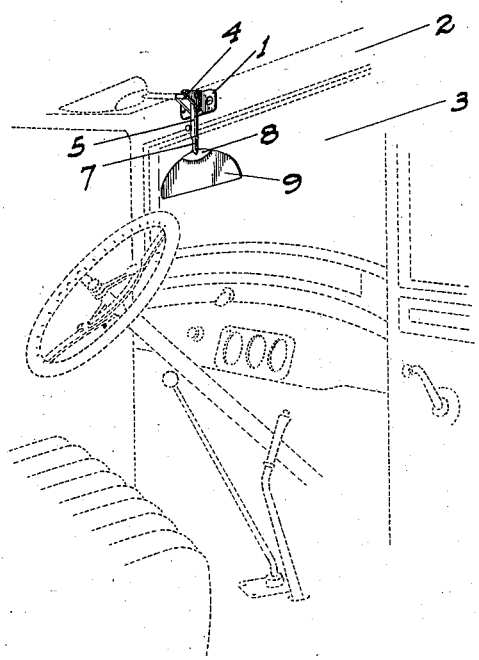
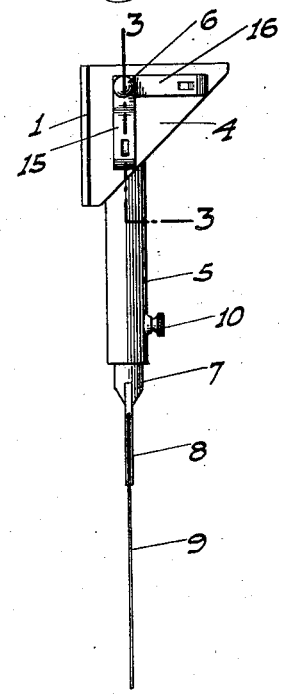
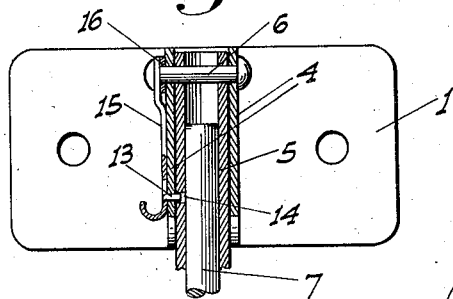
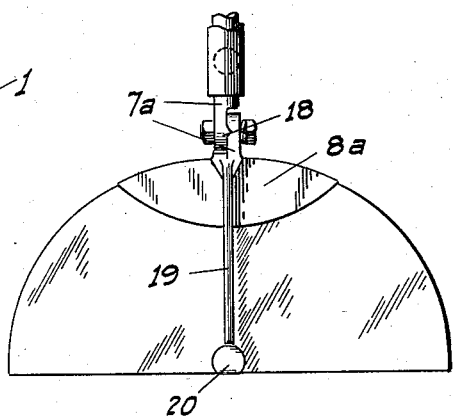
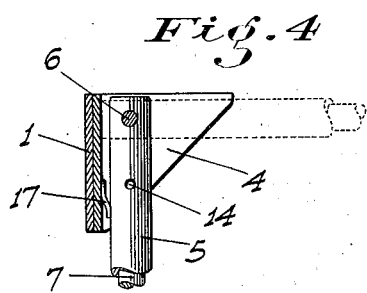
INVENTOR
R. E. Tidmarsh
BY
ATTORNEY Patented June 17, 1930

1,764,478

UNITED STATES PATENT OFFICE

RALPH E. TIDMARSH, OF SONORA, CALIFORNIA

NONGLARE SHIELD

Application filed March 16, 1928. Serial No. 262,197.

This invention relates to accessories for motor vehicles, my principal object being to provide a device to be mounted in the driver's compartment of a car against the wind shield, which will diffuse and cut the glare of the head lights of any approaching vehicle, thereby preventing the blinding of the driver and making it possible for him to see the road, and promoting safety in night driving.

A further object is to support and mount the shield so that it may be adjusted to different heights to suit the needs of different cars and drivers, and be independently moved from an operating position to one out of the way at an instant's notice.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Fig. 1 is a perspective outline of the driver's compartment of an automobile showing my improved shield in operating position.

Fig. 2 is a side elevation of the device detached.

Fig. 3 is an enlarged fragmentary section taken on the line 3—3 of Fig. 2.

Fig. 4 is a fragmentary side section of the device.

Fig. 5 is a fragmentary view showing a modified mounting of the shield on its supporting rod.

Referring now more particularly to the characters of reference on the drawings, the device comprises a flat plate 1 adapted for attachment to the transverse frame piece 2 of the car which extends above the wind shield 3. Secured to and projecting rearwardly from the plate is a bracket which comprises transversely spaced plates or ears 4. Depending from between these plates is a sleeve 5 pivoted at its upper end onto the bracket near the top and back by a cross pin 6, which is parallel to the plate 1. Slidable in the sleeve and projecting from the lower end thereof is a rod 7 the lower end of which is formed with a flat U-shaped clamp 8 engaging the upper edge of a shield 9, which is made of suitably colored celluloid or other translucent material and disposed so as to be parallel to the wind shield and the pin 6. The shield is preferably semi-circular in form with its lower edge horizontal so as not to obstruct a clear vision below the shield, but the shape of course may be altered to suit different conditions.

The rod 7 is held at any desired position in the sleeve so as to alter the vertical setting of the shield by a set screw 10 mounted in the sleeve.

The sleeve is held in a vertical position by means of a pin 13 or the like projecting through one bracket plate to engage a hole 14 provided in the sleeve. This pin is mounted on the free end of a flat vertical spring member 15 which is disposed on the outside of the bracket and is fixed at its opposite end onto the bracket by the pin 6. A similar but horizontally disposed spring and pin member 16 is mounted to hold the sleeve against downward movement when it has been raised to a horizontal position. A small spring 17 is preferably mounted between the bracket plates at the back to bear against the sleeve when the pin 13 is engaged therewith so as to form a cushion to prevent any possible vibration of the shield which might annoy or distract the driver. This spring also serves to throw the sleeve rearwardly somewhat after the holding pin has been withdrawn from the hole in the sleeve and again released, thus preventing the pin from again engaging the hole before the sleeve can be grasped and raised.

In the above described type the rod 7 is rigid from end to end. In the form of device shown in Fig. 5 the rod 7a has a swivel friction joint 18 just above the shield clamp 8a so as to permit the shield to be swung to a horizontal position without raising the entire structure, without, however, interfering with such raising in addition if desired or necessary. A small stiff rod 19 depends from the rod 7a below the hinge and behind the shield, terminating at its lower end in a small flat pad 20 which preferably engages the lower edge of the shield. This not only stiffens the shield, but enables the same to be swung about the joint 18 without bearing against the weak shield.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A nonglare shield including a bracket adapted to be mounted in a fixed position, a member pivoted at one end on the bracket, a shield element fixed on the other end of the member, a spring band on the outside of the bracket and secured thereto in common with the pivot of the said member, said spring band pressing at its other end toward the bracket, and a pin on said other end projecting through the bracket to engage a socket provided in said member.

2. A structure as in claim 1, with cushion means then bearing against the member to maintain one edge of the socket in close engagement with the pin to prevent rattling and vibration.

In testimony whereof I affix my signature.

RALPH E. TIDMARSH.